(12) United States Patent
Horowitz et al.

(10) Patent No.: US 7,624,447 B1
(45) Date of Patent: Nov. 24, 2009

(54) USING THRESHOLD LISTS FOR WORM DETECTION

(75) Inventors: Keren Horowitz, Tel Aviv (IL); Dror Karmi, Raanana (IL); Rami Rivlin, Tel Aviv (IL); Dan Touitou, Ramat Gan (IL); Rephael Tzadikario, Kfar Saba (IL); Yehiel Stein, Tel Aviv (IL)

(73) Assignee: Cisco Technology, Inc., San Jose, CA (US)

( * ) Notice: Subject to any disclaimer, the term of this patent is extended or adjusted under 35 U.S.C. 154(b) by 842 days.

(21) Appl. No.: 11/222,730

(22) Filed: Sep. 8, 2005

(51) Int. Cl.
*G06F 11/00* (2006.01)

(52) U.S. Cl. ....................................................... 726/23

(58) Field of Classification Search ............. 726/22–25; 713/153, 154, 151, 178, 188; 709/224, 229
See application file for complete search history.

(56) References Cited

U.S. PATENT DOCUMENTS

| | | | |
|---|---|---|---|
| 5,889,943 A | 3/1999 | Ji et al. | |
| 5,960,170 A | 9/1999 | Chen et al. | |
| 5,991,881 A | 11/1999 | Conklin et al. | |
| 6,055,236 A | 4/2000 | Nessett et al. | |
| 6,185,680 B1 | 2/2001 | Shimbo et al. | |
| 6,279,113 B1 | 8/2001 | Vaidya | |
| 6,321,338 B1 | 11/2001 | Porras et al. | |
| 6,397,335 B1 | 5/2002 | Franczek et al. | |
| 6,487,666 B1 | 11/2002 | Shanklin et al. | |
| 6,502,135 B1 | 12/2002 | Munger et al. | |
| 6,513,122 B1 | 1/2003 | Magdych et al. | |
| 6,725,378 B1 * | 4/2004 | Schuba et al. ................... 726/13 |
| 6,772,349 B1 * | 8/2004 | Martin et al. ................... 726/22 |
| 6,829,654 B1 | 12/2004 | Jungck | |
| 6,856,627 B2 | 2/2005 | Saleh et al. | |
| 6,880,090 B1 | 4/2005 | Shawcross | |
| 6,886,102 B1 | 4/2005 | Lyle | |
| 6,907,525 B2 | 6/2005 | Pazi et al. | |
| 6,922,417 B2 | 7/2005 | Vanlint | |
| 7,007,302 B1 | 2/2006 | Jagger et al. | |
| 7,039,950 B2 * | 5/2006 | Parekh et al. ................... 726/6 |
| 7,464,398 B2 * | 12/2008 | Robert et al. ................... 726/3 |
| 7,464,410 B1 * | 12/2008 | Halasz et al. ................... 726/23 |
| 2001/0039579 A1 | 11/2001 | Trcka et al. | |

(Continued)

OTHER PUBLICATIONS

Bennett, J.C.R. et al. "Hierarchical Packet Fair Queueing Algorithms", 1996.

(Continued)

*Primary Examiner*—Beemnet W Dada
(74) *Attorney, Agent, or Firm*—Abelman, Frayne & Schwab

(57) ABSTRACT

A computer-implemented method is provided for screening communication traffic. A list of one or more threshold pairs including respective first and second threshold values, each of which first threshold values is greater than one, are defined. Network traffic from a plurality of sources is monitored, so as to determine for each source a count of unique destination addresses to which the source transmitted data during a period of time. A response to malicious network traffic is invoked responsively to finding that each of a first number of the sources sent data to at least a second number of the destination addresses, wherein, for at least one of the threshold pairs, the first number is at least equal to the respective first threshold value, and the second number is at least equal to the respective second threshold value.

40 Claims, 7 Drawing Sheets

U.S. PATENT DOCUMENTS

| | | | |
|---|---|---|---|
| 2002/0083175 | A1 | 6/2002 | Afek et al. |
| 2003/0110274 | A1 | 6/2003 | Pazi et al. |
| 2003/0172289 | A1 | 9/2003 | Soppera |
| 2003/0200464 | A1 | 10/2003 | Kidron |
| 2004/0003116 | A1 | 1/2004 | Munger et al. |
| 2004/0093513 | A1 | 5/2004 | Cantrell et al. |
| 2004/0172557 | A1* | 9/2004 | Nakae et al. ............... 713/201 |
| 2004/0199791 | A1 | 10/2004 | Poletto et al. |
| 2004/0221190 | A1 | 11/2004 | Poletto et al. |
| 2004/0250124 | A1 | 12/2004 | Chesla et al. |
| 2005/0021740 | A1 | 1/2005 | Bar |
| 2005/0089016 | A1 | 4/2005 | Zhang et al. |
| 2005/0262556 | A1* | 11/2005 | Waisman et al. ............ 726/22 |
| 2008/0016562 | A1* | 1/2008 | Keeni ......................... 726/22 |

OTHER PUBLICATIONS

Bennett, J.C.R. et al. "High Speed, Scalable, and Accurate Implementation of Fair Queueing Algorithms in ATM Networks", 1996.

Bennett, J.C.R. et al. "WF2Q: Worst-Case Fair Weighted Fair Queueing", 1996.

Chiussi, F.M. et al. "Implementing Fair Queueing in ATM Switches: the Discrete-Rate Approach", 1998.

Chiussi, F.M. et al. "Minimum-Delay Self-Clocked Fair Queueing Algorithm for Packet-Switched Networks", 1998.

Demers, A. et al. "Analysis and Simulation of a Fair Queueing Algorithm", 1989 Association for Computing Machinery.

Eckhardt, D.A. et al. "Effort-limited Fair (ELF) Scheduling for wireless Networks", IEEE INFOCOM 2000.

Golestani, S.J. "Networks Delay Analysis of a Class of fair Queueing Algorithms", IEEE Journal on Selected Areas in Communications, vol. 13, No. 6, Aug. 1995, pp. 1057-1070.

Golestani, S.J. "A self-Clocked fair Queueing Scheme for Broadband Applications", IEEE 1994, pp. 5c.1.1-5c1.11.

Greenberg, Albert G. et al. "How Fair is Fair Queuing?" Journal of the Association for Computing Machinery vol. 39, No. 3, Jul. 1992, pp. 568-598.

Parekh, A.K.J. "A Generalized Processor Sharing Approach to Flow Control in Integrated Services Networks", Ph.D. Dissertation Massachusetts Institute of Technology, Feb. 1992.

Parekh, A.K.J. "A Generalized Processor Sharing Approach to Flow Control in Integrated Services Networks: The Multiple Node Case", IEEE/ACM Transactions on Networking vol. 2, No. 2, Apr. 1994, pp. 137-150.

Parekh, A.K.J. "A Generalized Processor Sharing Approach to Flow Control in Integrated Services Networks: The Single-Node Case", IEEE/ACM Transactions on Networking vol. 1, No. 3, Jun. 1993, pp. 344-357.

"Quality of Service Networking", downloaded from the web (address: http://www.cisco.com/univercd/cc/td/doc/cisintwk/ito_doc/qos.htm), Cisco Systems, Inc. 2002.

Rexford, J.L. et al. "Hardware Efficient Fair Queueing Architectures for high-Speed networks", IEEE 1996, pp. 5d.2.1-5d.2.9.

Shreedhar M. et al. "Efficient Fair Queueing Using Deficit Round-Robin", IEEE/ACM Transactions on networking vol. 4, No. 3, Jun. 1996, pp. 375-385.

Stiliadis, D. et al. "Frame-Based Fair Queueing: A New Traffic Scheduling Algorithm for Packet-Switched Networks", Jul. 1995, pp. 1-43.

Robert Stone, Center Track, An IP Overlay Network for Tracking Denial-of-Service Floods, MANOG17, Oct. 5, 1999, UUNET Technologies.

Robert Stone, "Center Track: An IP Overlay Network for Tracking DoS Floods", Proceedings of the 9th USENIX Security Symposium, Denver, Colorado, USA, Aug. 14-17, 2000.

* cited by examiner

USING THRESHOLD LISTS FOR WORM DETECTION

FIELD OF THE INVENTION

The present invention relates generally to computer networks, and specifically to methods and systems for protecting against malicious traffic in computer networks.

BACKGROUND OF THE INVENTION

"Worms" are programs that self-replicate across the Internet by exploiting security flaws in widely-used services. Well-known worms include Code Red (I and II), Nimda, Blaster, and Sasser. For example, Code Red I spread during the summer of 2001 by exploiting a security flaw in Microsoft® IIS web servers. Once it infected a server, the worm spread by launching 99 threads, each of which generated random IP addresses and attempted to compromise servers at these addresses.

The servers and networks infected by the worm often experience performance degradations. Such degradations are caused in part by the packets generated and received by an infected server as it attempts to discover and infect servers at random IP addresses (called "scanning"). For example, an infected server may send a large volume of SYN request packets to random IP addresses, each of which may respond with a SYN-ACK response packet. Such traffic may consume a large portion of the bandwidth of the connection of the infected network with the Internet. Additionally, SYN requests are typically buffered by the sending server for a period of time, tying up server resources.

Worms are sometimes used to launch a Denial-of-Service (DoS) attack, by controlling a large number of servers on the Internet. In a DoS attack, an attacker bombards a victim network or server with a large volume of message traffic. The traffic overload consumes the victim's available bandwidth, CPU capacity, or other critical system resources, and eventually brings the victim to a situation in which it is unable to serve its legitimate clients.

US Patent Application Publication 2005/0021740 to Bar, which is incorporated herein by reference, describes a method for processing communication traffic, including monitoring the communication traffic that is directed to a group of addresses on a network, and determining respective baseline characteristics of the communication traffic that is directed to each of the addresses in the group. Deviations from the respective baseline characteristics of the communication traffic directed to at least one of the addresses in the group are detected, as an indication that at least some of the communication traffic may be of malicious origin.

PCT Publication WO 03/050644 to Afek et al., which is incorporated herein by reference, describes a method for screening packet-based communication traffic. At least a first data packet, sent over a network from a source address to a destination address, is received. A determination is made, by analyzing the first data packet, that the first data packet was generated by a worm. In response to the determination, a second data packet sent over the network from the source address is blocked.

US Patent Application Publication 2002/0083175 to Afek et al., which is incorporated herein by reference, describes techniques for protecting against and/or responding to an overload condition at a node in a distributed network by diverting traffic otherwise destined for the victim to one or more other nodes, which can filter the diverted traffic, pass a portion of it to the victim, and/or effect processing of one or more of the diverted packets on behalf of the victim.

US Patent Application Publication 2003/0200464 to Kidron, which is incorporated herein by reference, describes a system for detecting and countering malicious code in an enterprise network. A pattern recognition processor monitors local operations on a plurality of local machines connected through an enterprise network, to detect irregular local behavior patterns. An alert may be generated after an irregularity in behavior pattern on a local machine is detected. Irregular behavior alerts from a plurality of local machines are analyzed. If similar alerts are received from at least a threshold number of local machines over a corresponding period of time, one or more countermeasure operations are selected based on the analysis of the irregular behavior alerts.

US Patent Application Publications 2004/0221190 and 2004/0199791 to Poletto et al., which are incorporated herein by reference, describe a system for detecting network intrusions and other conditions in a network. The system includes a plurality of collector devices that are disposed to collect data and statistical information on packets that are sent between nodes on a network. An aggregator device is disposed to receive data and statistical information from the plurality of collector devices. The aggregator determines network events by aggregating anomalies into network events.

PCT Publication WO 03/055148 to Brendel, which is incorporated herein by reference, describes a network traffic evaluation device that may be used to warn of or prevent traffic abnormalities such as denial of service attacks. The device includes a data interface to receive one or both of network traffic and data indicative of characteristics of network traffic. The network traffic and/or data received by the data interface is processed for predetermined characteristics that indicate that the network traffic contains a subset of attack traffic.

The present invention will be more fully understood from the following detailed description of embodiments thereof, taken together with the drawings in which:

DETAILED DESCRIPTION OF EMBODIMENTS

Overview

Figure 1:
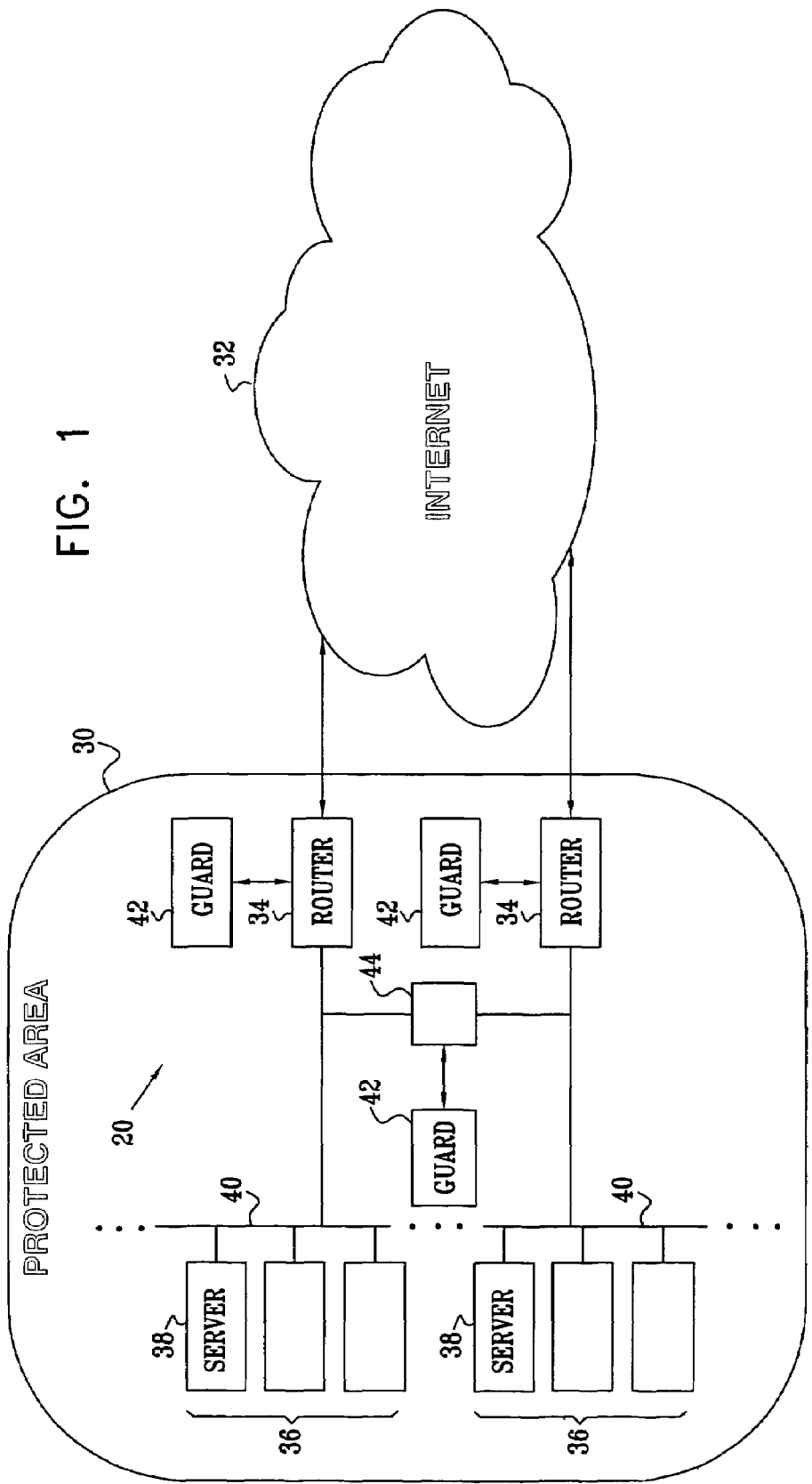
FIG. 1 is a block diagram that schematically illustrates a network security system, in accordance with an embodiment of the present invention.

One technique for detecting worm propagation is to identify "scanning anomalies" associated with the scanning activities of infected servers. A scanning anomaly occurs when a source attempts to access an abnormal number of destinations during a given time period. One technique for detecting scanning anomalies is to set a threshold for the number of destinations that any source is permitted to access during a given time period. Sources that exceed the threshold are reported as potentially infected and/or are blocked. Threshold-based techniques face the challenge of setting appropriate thresholds that are able to simultaneously minimize false positives and false negatives.

In embodiments of the present invention that are described hereinbelow, a network security system detects and blocks incoming, outgoing, and/or internal malicious network traffic, such as worm-generated network connections. The security system detects such malicious traffic by identifying scanning anomalies associated with malicious traffic. The system monitors network traffic from a plurality of sources, so as to determine for each source a number of unique destination addresses to which the source transmitted data during a period of time.

The system performs a two-tiered threshold test, pursuant to which the system detects a scanning anomaly upon determining that each of at least a first number of sources individually has sent data to at least a second number of unique destination addresses during the period of time. In other words, thresholds "X" and "Y" are set, and a scanning anomaly is determined to have occurred if at least Y sources each send data to at least X respective destinations. For some applications, the system uses a threshold list containing a plurality of such source/destination threshold pairs. The system detects a scanning anomaly upon determining that the traffic volume has exceeded the two-tiered threshold of any of the source/destination threshold pairs. Alternatively, the threshold list contains a single source/destination pair.

Once the security system detects a scanning anomaly, it may block all or a portion of the packets from the identified sources for a period of time, or from all sources that generate a number of connections exceeding a threshold value, or take other preventive action. For some applications, the system monitors only data associated with attempted connections by sources to destination addresses.

In some embodiments of the present invention, the threshold list takes the form of a list of pairs $\{(x_1, y_1), (x_2, y_2), \ldots, (x_n, y_n)\}$ wherein $x_1 < x_2 < x_2 < \ldots < x_{n-1} < x_n$; and $y_1 > y_2 > \ldots > y_{n-1} > y_n$. Here $x_i$ represents the number of destinations, and $y_i$ represents the number of source hosts. For example, the threshold list may be $\{(5, 20), (20, 5), (50, 3)\}$. The system detects a worm-generated scanning anomaly if, for any entry i in the threshold list, each of at least $y_i$ source hosts individually sends data to at least $x_i$ unique destination addresses during a certain period of time, e.g., one minute, two minutes, or five minutes.

By using such a threshold list, the network security system is generally able to detect the low-rate scanning activity that is typical of many worm propagation strategies. The system correctly identifies that such low-level activity by numerous hosts is indicative of malicious scanning. In addition, the use of such a threshold list helps to avoid false positive detection in the common occurrence in which one or a few source hosts legitimately attempt to establish connections with a large number of destinations during a short time period. The system correctly concludes that such a spike in traffic from one or a few source hosts is non-malicious, unless the number of connections from any given source host exceeds a high threshold.

For some applications, the network security system sets values of one or more of the thresholds by monitoring the protected area of the network during a period of time considered to be "peacetime" by the network administrator. Although a certain level of worm-generated traffic generally occurs and cannot be identified by the administrator even during perceived peacetime, this level is tolerable for the administrator. (Generally, much of such traffic is generated by older worms to which hosts in the network are no longer vulnerable.) The system uses this tolerable level as a baseline for determining the thresholds, and thus is sensitive to a level of scanning anomalies that is unusually high compared to the tolerable level during peacetime.

For some applications, the network security system monitors sources outside a protected area of a network that are attempting to connect to destinations inside the protected area of the network. Alternatively or additionally, the system monitors sources in the protected area that are attempting to connect to destinations inside or outside the protected area. Upon detecting an infected source, the security system typically generates a network administrator alert, so that the administrator can take appropriate action, such as cleaning infected servers, or, if the infected source is outside the network, permanently blocking the source.

The techniques for worm-generated traffic detection and blocking described herein may be used on their own, or in combination with other, complementary techniques for preventing DDoS attacks. Such techniques are described, for example, in the following patent and patent application publications, all of which are incorporated herein by reference:

U.S. Pat. No. 6,907,525 to Pazi et al.;
US Patent Application Publication 2005/0021740 to Bar;
PCT Publication WO 03/050644 to Afek et al.;
US Patent Application Publication 2002/0083175 to Afek et al.;
US Patent Application Publication 2003/0110274 to Pazi et al.; and
PCT Publication WO 04/090741 to Barr et al.

System Description

FIG. 1 is a block diagram that schematically illustrates a network security system 20, in accordance with an embodiment of the present invention. A protected area 30 of a network communicates with a wide-area network (WAN) 32, such as the Internet, through one or more routers 34. Protected area 30 comprises various network elements 36, such as servers 38, clients, switches, internal routers, and bridges, connected by one or more local-area networks (LANs) 40. Typically, although not necessarily, protected area 30 comprises a private network, such as an enterprise or campus network, or a network operated by an Internet Service Provider (ISP), as described below.

For some applications, to prevent the infection of servers 38 with a worm, a guard device 42 intercepts incoming packets from WAN 32 that are addressed to network elements 36. Guard device 42 analyzes these incoming packets in order to detect scanning activity that is suspected of being worm-generated, using techniques described hereinbelow with reference to FIGS. 8 and 9. Once worm-generated scanning activity has been detected, guard device 42 typically blocks all or a portion of the packets from the sources of such scanning activity for a period of time. Alternatively or additionally, once worm-generated scanning activity has been detected, guard device 42 blocks all or a portion of packets from any source that exceeds a global scanning threshold value. For some applications, system 20 sets the global scanning threshold value at least in part responsively to parameters of the worm-generated scanning activity, as described hereinbelow with reference to FIGS. 3 and 9. Packets originating from non-scanning sources are forwarded to their intended destinations.

Alternatively or additionally, guard device 42 monitors outgoing packets sent from servers 38 via WAN 32 to network elements outside protected area 30. By detecting and blocking infected outgoing packets, guard device 42 prevents servers 38 infected with a worm from establishing connections with servers outside protected area 30. As a result, infected servers 38 are not able to compromise outside servers or to participate in a DDoS attack on network elements outside protected area 30. Blocking such infected traffic also relieves pressure on the links between routers 34 and WAN 32, so that legitimate traffic is not impeded by malicious activity.

Further alternatively or additionally, guard device 42 monitors internal traffic of protected area 30, i.e., packets sent from servers 38 to other network elements 36 within protected area 30. By detecting and blocking infected packets, guard device 42 prevents servers 38 infected with a worm from establishing connections with and infecting other elements 36 in protected area 30. In order to monitor internal traffic, guard device 42 typically monitors traffic passing through at least one internal switch or router 44 of protected area 30.

Guard device 42 may perform these packet screening and diversion functions at all times, or it may alternatively become active only under stress conditions, in which a worm attack on or by servers 38 is expected or suspected. For example, guard device 42 may become active when an unusually large number of incoming SYN request packets is detected, when other traffic statistics indicate that an attack may be in progress, and/or when a network administrator is aware that a worm is active over the Internet.

For some applications, guard device 42 comprises a general-purpose computer, which is programmed in software to carry out the functions described herein. The software may be downloaded to the computer in electronic form, over a network, for example, or it may alternatively be supplied to the computer on tangible media, such as CD-ROM. Further alternatively, guard device 42 may be implemented in dedicated hardware logic, or using a combination of hardware and software elements. The guard device may be a standalone unit, or it may alternatively be integrated with other communication or computing equipment, such as router 34, a firewall, or an intrusion detection system (not shown).

In practical applications, one or more guard devices 42 may be used to protect a cluster of servers 38, or they may be used to protect an entire LAN, intranet or a collection of servers whose traffic is diverted to the guard devices. The guard functionality may be distributed among multiple guard devices 42, at one or more access points to protected area 30, or within protected area 30. In applications using more than one guard device, the guard devices may share one or more common data repositories, or may otherwise communicate with each other, such as for performing aggregated statistical analysis and/or maintaining a common record of suspected sources of malicious traffic. The guard devices may be deployed in configurations similar to firewalls known in the art. Generally, the guard devices have sufficient processing capacity so that they do not themselves become a bottleneck in the case of a worm attack. While certain techniques are described herein with respect to screening incoming and/or outgoing traffic to/from servers 38, these techniques may also be used to screen incoming and/or outgoing traffic to/from other network elements 36, such as client computers, that are capable of being infected with a worm. Routers 42 may comprise routers of the type commercially available and commonly used on an IP network, or other network elements capable of redirecting traffic and otherwise providing the functions commonly performed by routers.

Figure 2:
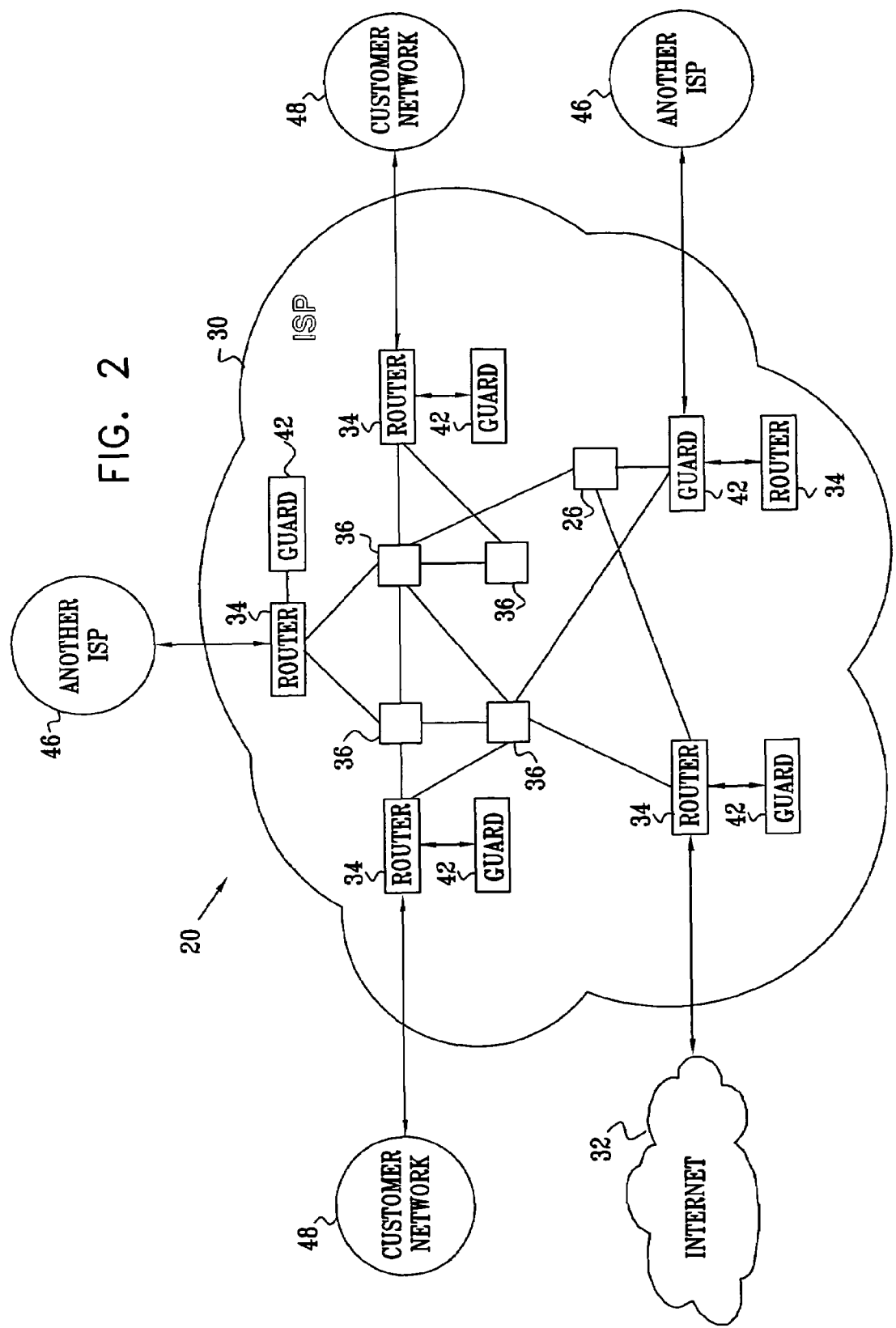
FIG. 2 is a block diagram that schematically illustrates the network security system of FIG. 1 deployed by an Internet Service Provider (ISP), in accordance with an embodiment of the present invention.

FIG. 2 is a block diagram that schematically illustrates network security system 20 deployed on protected area 30 of a network belonging to an Internet Service Provider (ISP), in accordance with an embodiment of the present invention. Protected area 30 communicates through one or more routers 34 with external networks, such as (a) public wide-area network (WAN) 32, as well as (b) other ISPs 46, either at private or public peering points, and (c) networks 48 of customers. Protected area 30 comprises various network elements 36, such as routers, switches, bridges, servers, and clients. One or more security devices 42 process incoming and/or outgoing packets from/to external networks. Typically, each security device is connected in a lollipop fashion to one of the ports of a corresponding router. The router passes certain incoming and/or outgoing packets (or, in some circumstances, all incoming and/or outgoing packets) to the security device for analysis, based on preprogrammed routing criteria. Security devices 42 analyze the packets in order to prevent the spread of worms and/or worm-generated traffic between different external networks and between external networks and network elements 36, using the techniques described herein.

Figure 3:
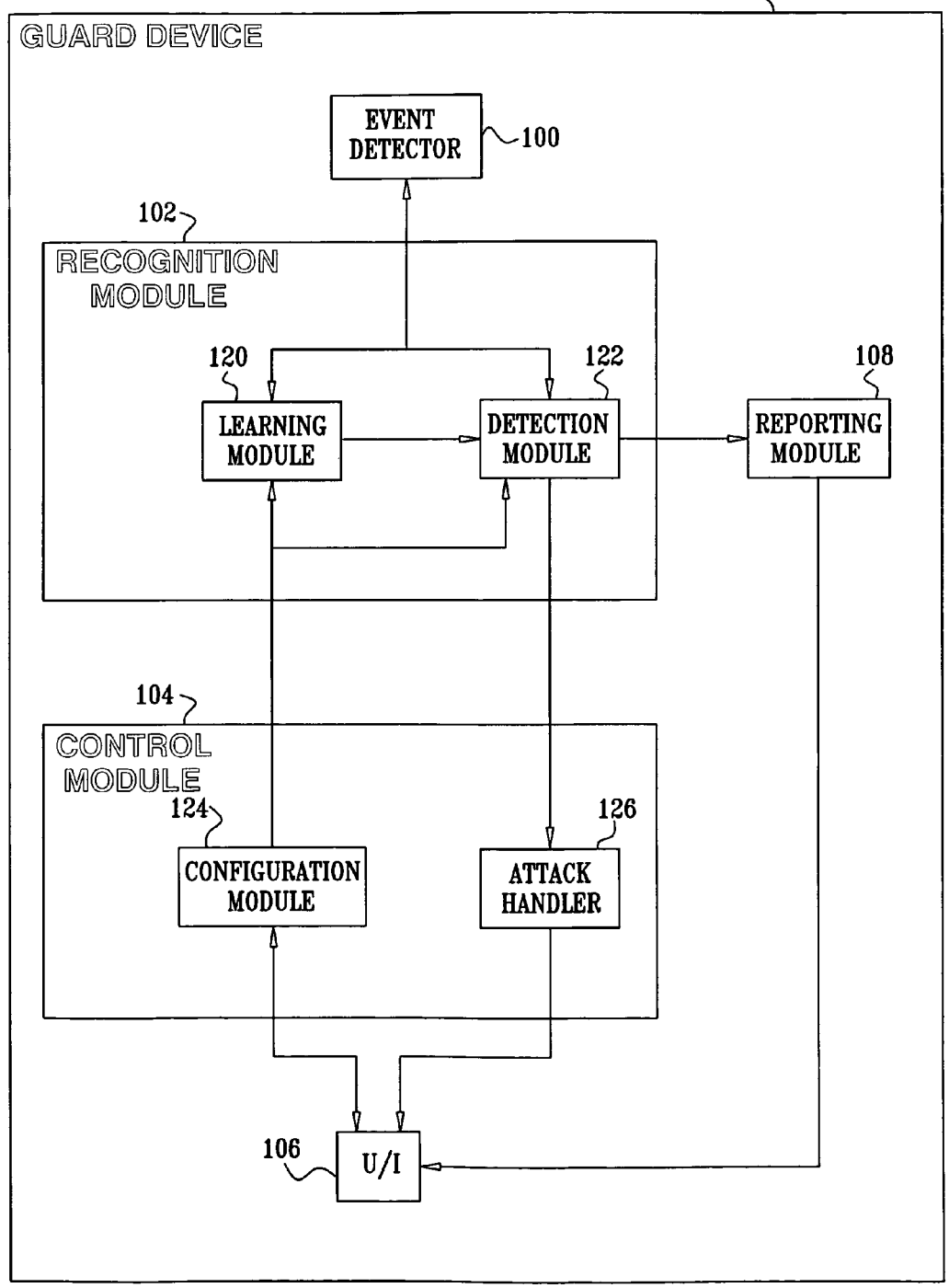
FIG. 3 is a block diagram that schematically illustrates components of a guard device in the network security system of FIG. 1, in accordance with an embodiment of the present invention.

FIG. 3 is a block diagram that schematically illustrates components of guard device 42, in accordance with an embodiment of the present invention. Guard device 42 comprises an event detector 100, a recognition module 102, a control module 104, a user interface 106, and a reporting module 108, each as described in more detail hereinbelow.

Event detector 100 monitors traffic in order to detect connection events. Event detector 100 notifies recognition module 102 of all identified events. Alternatively, the event detector notifies the recognition module of a representative sample of detected events. In one embodiment, event detector 100 notifies recognition module 102 of the source IP address, destination IP address, and destination port of all unsuccessful (i.e., non-established) attempted connections. For example, the event detector may define an attempted TCP connection as unsuccessful when a source sends a SYN packet and does not send additional packets in the protocol (e.g., an ACK packet) within a predefined period of time (e.g., within about 5 seconds, about 10 seconds, about 15 second, or about 20 seconds). Event detector 100 maintains a database of open connections in order to monitor the attempted connections and detect unsuccessful connections. Alternatively, for some applications, event detector 100 identifies and notifies recognition module 102 of all attempted connections, whether successful or unsuccessful. For some applications, event detector 100 sends notifications to recognition module 102 using a UDP port.

Recognition module 102 comprises a learning module 120 and a detection module 122. Recognition module 102 processes connection events received from event detector 100 to develop data that is analyzed by the learning and detection modules.

Detection module 122 detects worm-generated scanning activity and other scanning activity using a set of policies, each of which defines a set of threshold values for a particular destination port (i.e., service). In order to perform such detection, detection module 122 maintains data structures containing threshold and current activity data, as described hereinbelow with reference to FIG. 8. Policies are created and/or configured using a configuration module 124 of control module 104. Alternatively or additionally, learning module 120 creates a new policy automatically when the module detects a new service, as described hereinbelow with reference to FIG. 6. The thresholds of each policy are determined by learning module 120, as described hereinbelow with reference to FIG. 6. Alternatively or additionally, configuration module 124 sets default values for the thresholds, which may be overridden by learning module 120.

Upon initial start-up of guard device 42, control module 104 activates learning module 120 to perform initial learning of traffic patterns during a period of time perceived to be "peacetime" by a network administrator. After this initial learning, control module 104 activates detection module 122 for continuous monitoring of protected area 30. For some applications, control module 104 subsequently activates learning module 120 to perform continuous real-time learning and refining of thresholds while detection module 122 continues to actively monitor protected area 30. "Peacetime," as used herein, including in the claims, includes periods of time during which, in the judgment of the system administrator, the level of malicious activity is relatively low, and/or during which the level of malicious activity detected by an automatic monitoring system is lower than a pre-defined threshold.

Recognition module 102 typically maintains three data structures:

- an event data structure 200, described hereinbelow with reference to FIG. 4, which is used both by learning module 120 for gathering and analyzing connection event data during both peacetime and continuous learning, and by detection module 122 for gathering and analyzing connection event data;
- a threshold data structure 350, described hereinbelow with reference to FIG. 6, which is used by learning module 120 to analyze the data in event data structure 200, and to store the resulting thresholds and policies; and
- a detection data structure 400, described hereinbelow with reference to FIG. 8, which is used by detection module 122 to store data derived from event data structure 200 and thresholds and policies determined by learning module 120, and to analyze the data against the thresholds.

In addition, recognition module 102 typically maintains a global scanning threshold variable for each destination port (i.e., each service). Detection module 122 identifies a single source IP address as a scanner when the source IP address generates more connection events than the threshold value during a period of time. Detection module 122 performs such checking continuously, both during an identified worm attack and when no worm attack is occurring. For example, the global scanning threshold value for a destination port may be 100. Control module 104 adjusts the value of the global scanning threshold variable based on whether a worm attack is occurring, as described hereinbelow with reference to step 468 of FIG. 9.

Figure 4:
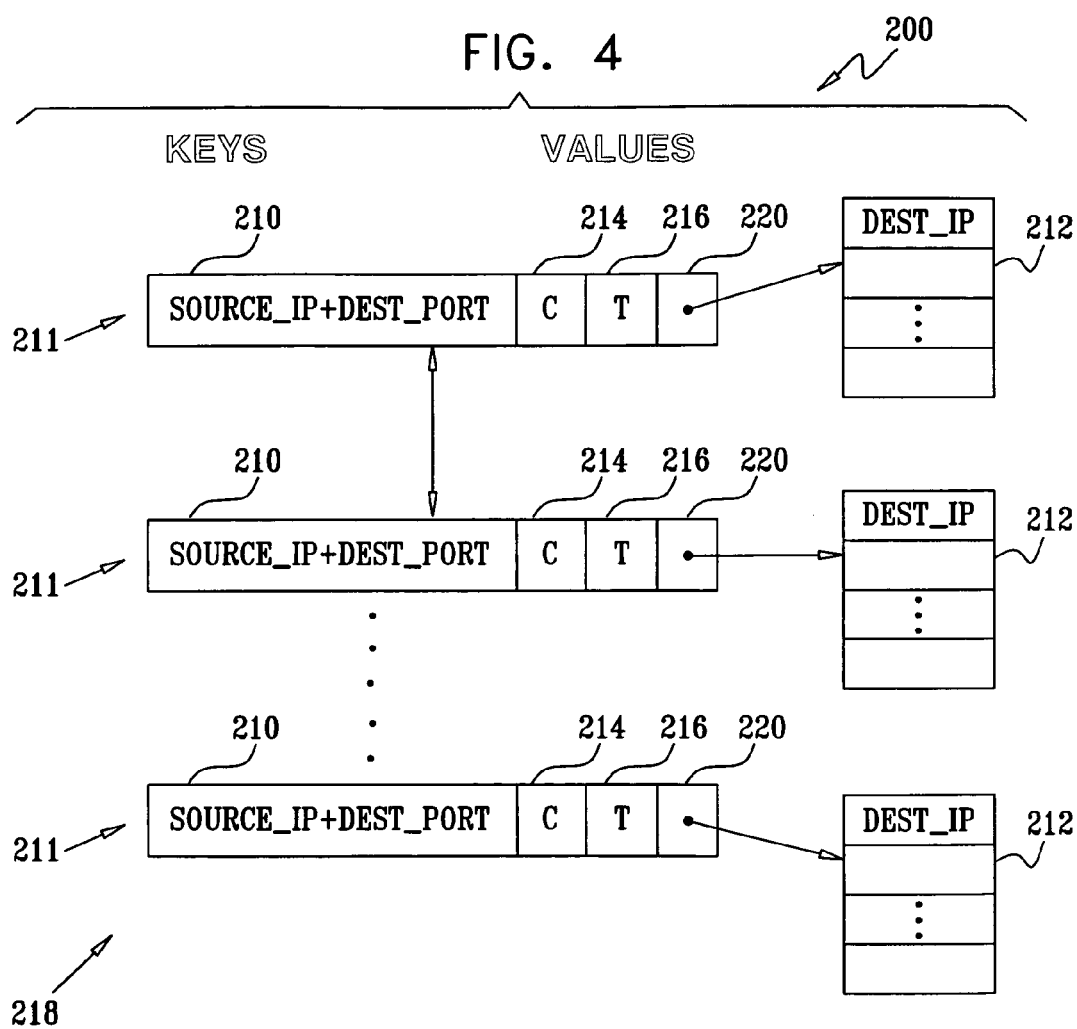
FIG. 4 is a schematic illustration of an event data structure, in accordance with an embodiment of the present invention.

Reference is made to FIG. 4, which is a schematic illustration of event data structure 200, in accordance with an embodiment of the present invention. Learning module 120 and detection module 122 use event data structure 200 to gather and analyze connection event data generated by event detector 100. Recognition module 102 maintains a separate event data structure 200 for each policy.

Event data structure 200 keeps track of the number of unique destination IP addresses with which each source IP address has attempted to establish a connection (typically, unsuccessfully) during a certain time period, which may be configured to any one of a number of different values. Event data structure 200 monitors destination ports (i.e., services), and tracks each source IP address/destination port combination 210 separately. To do so, event data structure 200 holds, for each source IP address/destination port combination 210, an entry 211 containing: (a) source IP address/destination port combination 210, (b) a list 212 of all unique destination IP addresses to which the source IP address has attempted a connection (typically, an unsuccessful connection), (c) a counter 214 of the number of unique destination IP addresses in list 212, and, for some applications, (d) a timestamp 216 of the earliest event received for entry 211 during the current time period.

For some applications, event data structure 200 comprises a hash table 218. The hash table key is the combination of source IP address and destination port (or, for applications in which there is just a single destination port, or in which the destination port is not tracked, just the source IP address). For example, the hash key may be calculated using the following equation:

Hash key=source IP address XOR destination port (modulo hash size)

Each entry 211 in the hash table includes: the hash key of source IP address/destination port combination 210, counter 214, timestamp 216, and a pointer 220 to the respective list 212. For some applications, list 212 comprises a hash table, such as a linked (e.g., doubly-linked) list.

For some applications, hash table 218 is implemented as a linked list, such as a doubly-linked list. For some applications, the linked list is a least recently used (LRU) linked list, ordered from the most recently used entry 211 to the least recently used entry 211. (If the LRU linked list becomes full, the least recently used entry 211 is discarded.) When a lookup is made in the LRU linked list, the found entry 211 is moved to the head of the list.

For some applications, recognition module 102 is configured to validate attempted connections before entering the connections into hash table 218, in order to prevent overflow in the hash table. To perform such validation, recognition module 102 identifies and excludes slow flows, in order to prevent an accumulation of such slow flows from causing an overflow in the hash table. For some applications, recognition module 102 implements such validation using a bitmap, which may use a tuple comprising the source IP address and the destination port of each attempted connection.

Figure 5:
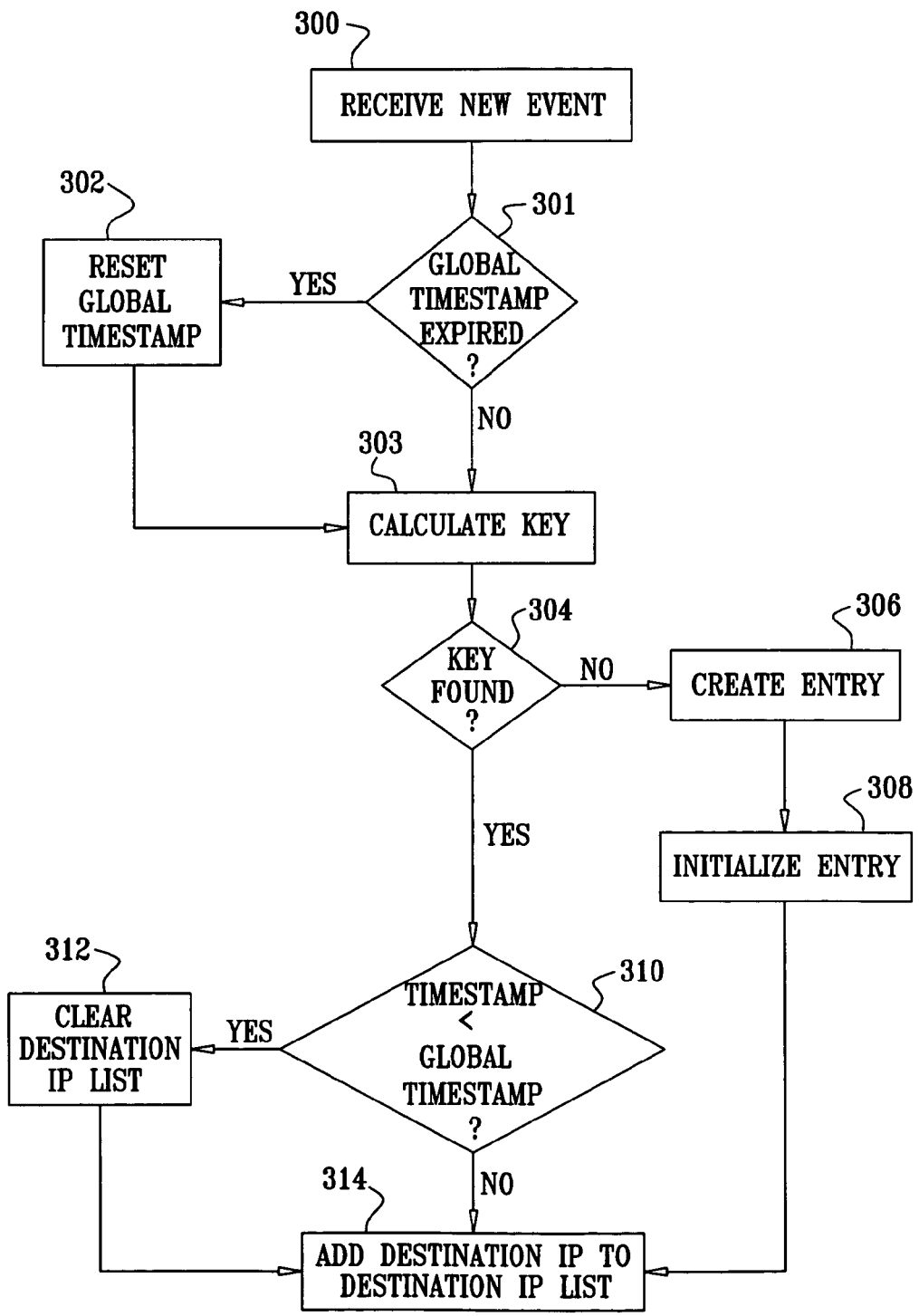
FIG. 5 is a flow chart that schematically illustrates a method for handling a new event, in accordance with an embodiment of the present invention.

Reference is made to FIG. 5, which is a flow chart that schematically illustrates a method for handling a new event, in accordance with an embodiment of the present invention. At an event receipt step 300, recognition module 102 receives an event (typically an unsuccessful connection attempt) from event detector 100. At a global timestamp check step 301, recognition module 102 compares the timestamp of the event with a global timestamp. Recognition module 102 maintains this global timestamp in order to keep track of the current detection time periods. If the timestamp of the event exceeds the global timestamp by at least the configured time period duration (e.g., 60 seconds), recognition module 102 resets the global timestamp to the current timestamp, at a global timestamp reset step 302. In any event, recognition module 102 proceeds to a key calculation step 303, at which the recognition module calculates a key for the source IP address/destination port of the event. At a check step 304, the learning module checks whether hash table 218 already contains the key. If the hash table does not contain the key, recognition module 102 creates a new entry 211 in hash table 218 for the key, at an entry creation step 306. At an entry initialization step 308, the recognition module sets counter 214 equal to 1, and timestamp 216 equal to the current time. The recognition module then proceeds to step 314, described below.

On the other hand, if recognition module 102 finds at check step 304 that hash table 218 does contain the key, recognition module 102 checks timestamp 216 of the existing entry 211 against the global timestamp, at a timestamp check step 310. A value of timestamp 216 earlier than the global timestamp indicates that the existing entry 211 has existed for longer than the duration of a single time period. Recognition module 102 therefore clears destination IP list 212, resets counter 214 to zero, and resets timestamp 216 to the current timestamp, at a clear destination IP list step 312. In any event, at an update destination IP list step 314, recognition module 102 adds the destination IP address of the event to destination IP list 212, and increments counter 214 if the destination IP address was not already in list 212.

Alternatively, rather than checking for the expiration of each entry 211 separately as events are received therefor, as described above with reference to steps 310 and 312, recognition module 102 clears destination IP lists 212 of all entries 211 together upon the expiration of each time period.

Figure 6:
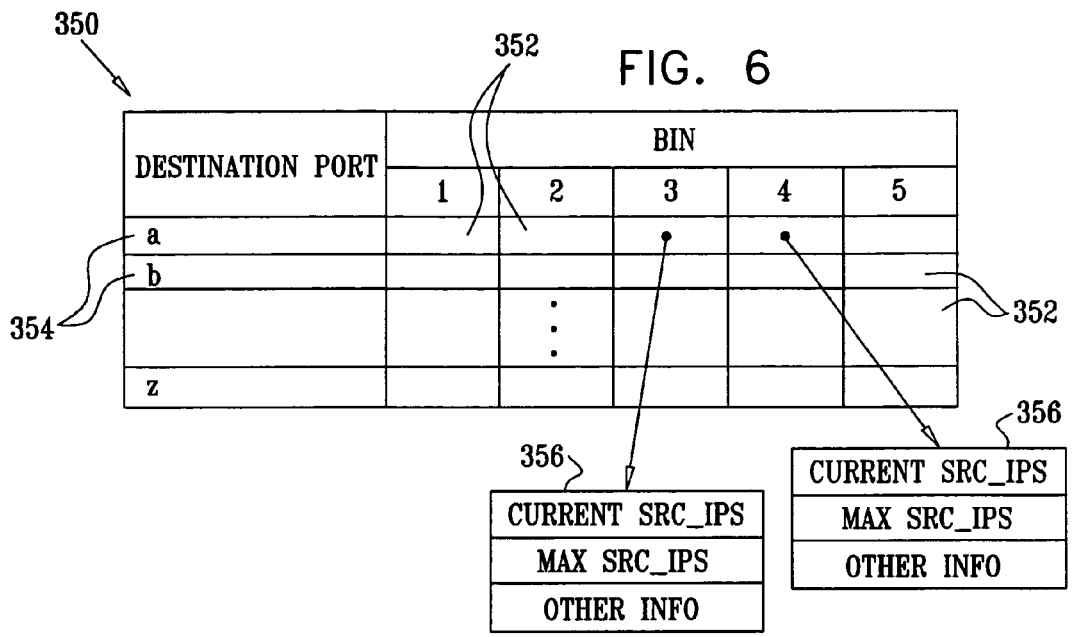
FIG. 6 a schematic illustration of a threshold data structure, in accordance with an embodiment of the present invention.

Reference is made to FIG. 6, which is a schematic illustration of threshold data structure 350, in accordance with an embodiment of the present invention. Learning module 120 uses the data from event data structure 200 to populate threshold data structure 350. Learning module 120 uses the data in threshold data structure 350 to determine thresholds for existing policies and to create new policies, as described hereinbelow.

Threshold data structure 350 comprises a table having a plurality of bins 352 for each destination port 354, such as between 3 and 5 bins per destination port. Alternatively, for applications in which learning module 120 does not track destination ports, threshold data structure 350 holds a single set of bins for all destination ports in aggregate. Each bin holds the number of source IP addresses that attempted to establish connections with a number of unique destination IP addresses greater than a configurable cut-off value for the bin. The cut-off values of the bins are either pre-configured per destination port, and/or learned by learning module 120. For example, there may be five bins for a particular destination port, having the following respective cut-off values: 5, 10, 20, 50, and 100 destination IP addresses. Each bin 352 contains a pointer to an object 356 that holds the number of source IP addresses that attempted, during the current time period, to establish connections with a number of unique destination IP addresses at least equal to the cut-off value of the bin. Object 356 also holds the maximum value of the number of source IP addresses in the associated bin that has occurred throughout all time periods during which learning module 120 has performed learning activities. Object 356 optionally holds other data. It is noted that the binning is cumulative, i.e., in the example given above, if a source IP address attempts to establish connections with 12 unique destination IP addresses, the source IP address will be counted both in the bin having the cut-off value of 5, and in the bin having the cut-off value of 10.

At the conclusion of peacetime learning, learning module 120 uses the data in threshold data structure 350 to set threshold values for use by detection module 122 during monitoring and protection, as described hereinbelow with reference to FIG. 9. Learning module 120 sets the threshold value for each bin 352 equal to the respective maximum values held by object 356, as described above, times a configurable constant K1. These threshold values represent the maximum number of source IP addresses considered normal (i.e., not indicative of a worm) by detection module 122 for each bin, for a given destination port. For example, K1 may be between about 1 and about 2, such as 1.2.

Figure 7:
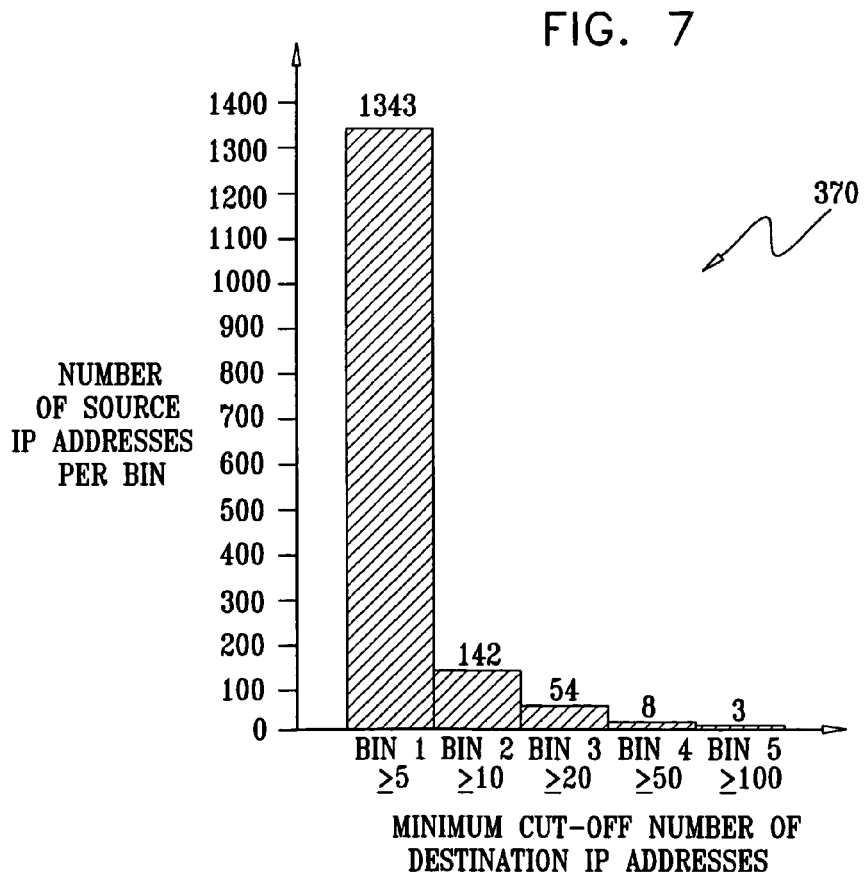
FIG. 7 is an exemplary histogram illustrating data stored in the threshold data structure of FIG. 6, in accordance with an embodiment of the present invention.

Reference is made to FIG. 7, which is an exemplary histogram 370 illustrating data stored in threshold data structure 350, in accordance with an embodiment of the present invention. Histogram 370 represent one way of visualizing the data stored in threshold data structure 350. In this example, the data from threshold data structure 350 is arranged in a threshold list taking the form of $\{(x_1, y_1), (x_2, y_2), \ldots, (x_n, y_n)\}$, wherein $x_i$ is the minimum cut-off number of destination IP addresses for bin i, and $y_i$ is the number of source IP addresses that attempted to establish connections to a number of destination IP addresses at least equal $x_i$. In the example shown in FIG. 7, the threshold list has the following values: $\{(5, 1343), (10, 142), (20, 54), (50, 8), (100, 3)\}$.

For some applications, recognition module 102 uses different bin cut-off values for learning module 120 and detection module 122. For example, recognition module 102 may set the bin cut-off values for detection module 122 using the following equation:

$$x_i(D) = x_i(L) * K2,$$

wherein $x_i(D)$ and $x_i(L)$ are the minimum cut-off number of destination IP addresses for bin i for detection module 122 and learning module 120, respectively, and K2 is a constant, e.g. between about 1 and about 2, such as 1.2. Increasing the cut-off values for detection raises the bar for worm detection, thereby decreasing the likelihood of false positives. Alternatively, $x_i(D)$ is set to the sum of $x_i(L)$ and K2, rather than the product; in this case K2 may be between about 2 and about 5.

In addition to setting thresholds by bin for each destination port, learning module 120 sets the global scanning threshold value for each destination port, as described hereinabove with reference to FIG. 3 and shown in greater detail hereinbelow with reference to FIG. 9, to the greatest number of destination IP addresses accessed by any source IP address for the destination port. For some applications, learning module 120 sets the global scanning threshold for each destination port to either the sum or the product of a constant and the greatest number of destination IP addresses accessed by any source IP address for the destination port.

In an embodiment of the present invention, learning module 120 is configured to automatically identify and begin tracking new destination ports (i.e., services) when a configurable minimum number of attempts have been made to connect to the port. For services for which learning module 120 has not yet developed a policy, system 10 is configured with a generic "any" policy having a set of thresholds. Typically, detection module 122 separately tracks events for each such policy-less service, rather than tracking events for such services on an aggregate basis. For some applications, the learning module identifies a new service when a number of connections thereto in at least one of the bins crosses the threshold of the bin of the "any" policy.

In an embodiment of the present invention, learning module 120 is configured to perform continuous learning while detection module 122 simultaneously monitors and protects protected area 30 against scanning activity. Such continuous learning includes updating existing thresholds, developing new thresholds for new policies, and detecting new services and developing new policies for them. Learning module 120 periodically (e.g., once every 24 hours) updates existing thresholds by combining the existing thresholds with the newly learned thresholds. Typical user-configurable options for combining the existing thresholds with the newly learned thresholds include: taking the maximum values of existing and newly learned threshold values, averaging the existing and newly learned threshold values, or always using the newly learned threshold values.

Reference is again made to FIG. 3. Control module 104 comprises a configuration module 124 and an attack handler 126. Configuration module 124 maintains the configuration of the policies used for worm detection. Attack handler 126 handles attack events detected by detection module 122. Control module 104 maintains several states, including: (a) peacetime learning, (b) monitoring during a period when no worm attack has been detected, (c) monitoring during a worm attack, and (d) continuous learning, which may occur during states (b) and (c).

Figure 8:
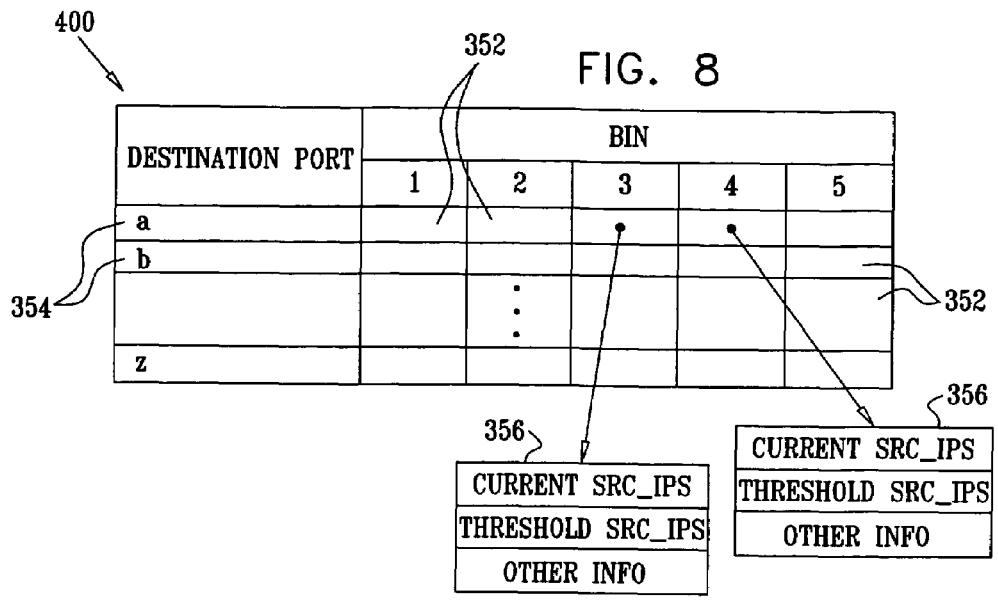
FIG. 8 is a schematic illustration of a detection data structure, in accordance with an embodiment of the present invention.

Reference is made to FIG. 8, which is a schematic illustration of a detection data structure 400, in accordance with an embodiment of the present invention. Detection module 122 uses data from event data structure 200 to populate detection data structure 400. Detection module 122 uses the data in detection data structure 400 to detect worm-generated scanning traffic. Detection data structure 400 is similar to threshold data structure 350, described hereinabove with reference to FIG. 6, except that each object 356 holds a threshold value, against which detection module compares the number of source IP addresses for the current time period.

Figure 9:
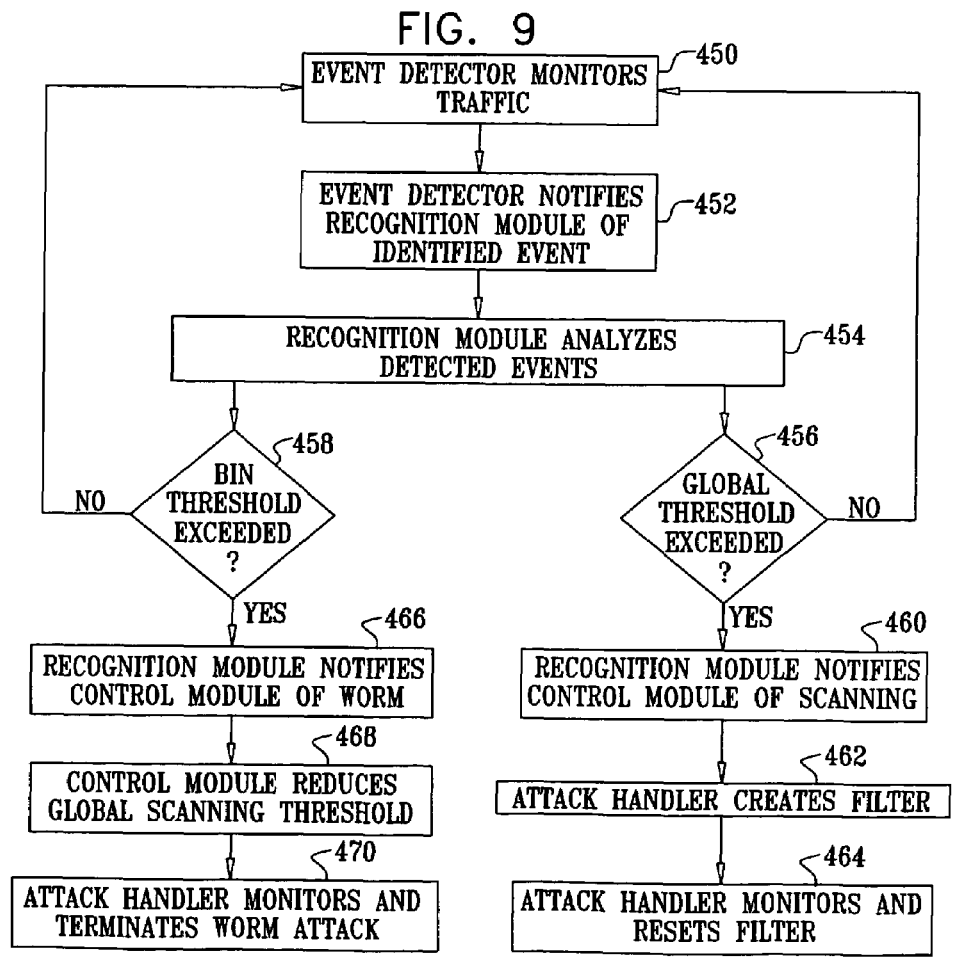
FIG. 9 is a flow chart that schematically illustrates a method for detecting and protecting against scanning activity, including worm-generated scanning activity, in accordance with an embodiment of the present invention.

Reference is made to FIG. 9, which is a flow chart that schematically illustrates a method for detecting and protecting against scanning activity, including worm-generated scanning activity, in accordance with an embodiment of the present invention. Event detector 100, control module 104, and detection module 122 perform this method after learning module 120 has completed its initial learning and threshold configuration, as described hereinabove with reference to FIGS. 6 and 7. For the sake of clarity, the steps of this method are generally described as occurring sequentially; in actual practice, however, several of the steps are performed in parallel, some substantially continuously.

At an event monitoring step 450, event detector 100 monitors traffic, in order to detect connection events. Upon detecting an event (typically an unsuccessful attempted connection), event detector 100 notifies recognition module 102 of the identified event, at an event notification step 452. At an analysis step 454, recognition module 102 stores and analyzes the events using data structures 200 and 400, as described hereinabove with reference to FIGS. 4 and 8, respectively. Recognition module 102 performs two checks in parallel: (1) the module checks whether the global scanning threshold variable has been exceeded by any single source IP address, for any destination port, at a global scanning threshold check step 456, and (2) the module checks whether any of the bin-specific thresholds have been exceeded for any destination port, at a bin threshold check step 458. It is noted that recognition module 102 typically performs scanning detection at global scanning threshold check step 456 regardless of whether a worm has been detected.

If recognition module 102 finds that the global scanning threshold has been exceeded at global scanning threshold check step 456, recognition module 102 notifies control module 104 that a scanner has been detected, at a scanner notification step 460. At a filter creation step 462, control module 104 drives attack handler 126 to create a dynamic filter for the specific source IP address performing the detected scanning. Dynamic filters include one or more of the following commands: notify (according to which an administrator is notified of the scanning activity), drop (according to which the packets from the source IP address are dropped for a configurable period of time), and remote activate (according to which event detector 100 remotely activates a pre-configured guard device 42 to provide protection against the attack). Which filter to create is configurable by the network administrator in configuration module 124 of control module 104. For some applications, attack handler 126 is configured to drop packets only if the scanning activity is detected during a worm attack, as described immediately below. At a filter monitoring step 464, attack handler 126 monitors the dynamic filter to determine whether traffic therethrough has ceased. If no traffic passes through the filter for a configurable period of time, attack handler 126 deletes the filter.

If recognition module 102 finds that any of the bin-specific thresholds has been exceeded at bin threshold check step 458, recognition module 102 notifies control module 104 that a worm has been detected, at a worm notification step 466. In order to increase sensitivity to scanning activity during the worm attack, control module 104 reduces the global scanning threshold by setting it equal to the cut-off value (number of destination IP addresses) of the bin whose threshold (number of source IP addresses) was exceeded, at a scanning threshold reduction step 468. This greater sensitivity to scanning is maintained throughout the duration of the worm attack. (If the global scanning threshold was already less than the cut-off value of the bin, control module 104 skips step 468.) Control module 104 also enters the worm attack state mentioned above. Control module 104 stores the original bin threshold value for later restoration upon cessation of the worm attack. At a worm monitoring step 470, attack handler 126 monitors the worm attack to detect its cessation. The attack handler determines that the worm attach has ceased when all the dynamic filters created at step 462 have been deleted at step 464, as described above. Upon cessation of the attack, control module 104 re-enters the non-worm attack state mentioned above.

In an embodiment of the present invention, detection module 122 stores information regarding worm attacks detected at check step 458 of FIG. 9 in a detected worm data structure, e.g., an LRU hash table. When detection module 122 detects a worm attack at check step 458 of FIG. 9, detection module 122 checks that the detected worm has not already been recorded in the detected worm data structure, before notifying control module 104 of the worm at notification step 466. Without the use of the detected worm data structure, detection module 122 might repeatedly notify control module 104 of the same worm, because detection data structure 400 is cleared every detection time period. Control module 104 periodically removes worms from the detected worm data structure when no traffic passes through the corresponding filter for a configurable period of time. Alternatively or additionally, these techniques are used at steps 456 and 460 of FIG. 9, for checking whether a scanner has been previously identified.

For some applications, detection module 122 includes the following information when notifying control module 104 that a worm has been detected, at step 466 of FIG. 9. For some applications, recognition module 102 uses a binary interface for notifying control module 104 of this information (exemplary numbers of bytes of each field are shown in parentheses).

victim ID (4)

policy ID (4) (as mentioned hereinabove, system 20 maintains separate policies for each destination port (i.e., service), as well as a generic "any" policy; each such policy is assigned a unique policy ID)
source IP (4)
source mask (4)
protocol (1)
source port (2)
destination port (2)
destination IP (4)
policy threshold (4) (i.e., the current scanner threshold, or, in the case of a histogram anomaly, the number of destination IP addresses)
policy second threshold (4) (i.e., in the case of a histogram anomaly, the number of source IP addresses)

Reference is again made to FIG. 4. In an embodiment of the present invention, recognition module 102 uses a an alternative data structure to reduce storage used for storing destination IP addresses. In this embodiment, event data structure 200 is the same as described hereinabove with reference to FIG. 4, except that entries 211 do not comprise lists 212 of destination IP addresses. Entries 211 continue to use counter 214 to record the number of unique destination IP addresses. To keep track of the unique destination IP addresses without using lists 212, event data structure 200 maintains a separate data structure that is adapted to hold, in a single data structure, the destination IP addresses for all of the source IP addresses and destination ports. The data structure holds tuples, each of which includes a source IP address, a destination IP address, and a destination port. When an event is received, recognition module 102 checks whether the data structure already holds the tuple of the event. If the data structure holds the tuple, the destination IP address is not new for the event's source IP address and destination port. If the data structure does not hold the tuple, the destination IP address is new, and recognition module 102 adds the tuple to the data structure. Recognition module 102 clears the data structure once per detection time period. An O(1) algorithm can be used for this purpose.

For some applications, the data structure comprises a bitmap holding a hash code of each tuple, such as a fixed size bitmap. The bitmap is large enough to prevent or minimize the likelihood of collisions (which could cause false negatives).

Reference is again made to FIG. 3. In an embodiment of the present invention, reporting module 108 is adapted to gather information regarding detected scanning events and worms, and to produce an aggregated report of such activity for the network administrator.

In an embodiment of the present invention, the modules of guard device 42 communicate with one another using XML messages. For example, control module 104 may activate recognition module 102 by sending the XML message shown in Appendix A hereinbelow.

In an embodiment of the present invention, control module 104 uses the syntax shown in Appendix B hereinbelow for displaying a summary of a dynamic filter created at filter creation step 462 of the method described hereinabove with reference to FIG. 9.

In an embodiment of the present invention, control module 104 uses the syntax shown in Appendix C hereinbelow for displaying details of a dynamic filter created at filter creation step 462 of the method described hereinabove with reference to FIG. 9.

Although some embodiments described hereinabove make reference to specific communication protocols and conventions, the principles of the present invention may similarly be applied in other data communication contexts. For example, techniques described herein may be applied to protecting against worm-generated traffic sent over SMTP.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

APPENDIX A

```
<REQUEST
    ACTION    =    "addRecognizer"
    VICTIM    =    "vic"
>
    <ATTACK_RECOGNIZER
        SERVICE          =    "any"
        BASE_LEARNER    =         "worm_tcp"
        TRIGGER_TYPE    =         "non_estb_conns"
        PROTECTION_LEVEL =         "analysis"
    >
        <scanners_histogram
            ID      =    "111"
            ACTION      =    "remote-activate"
            ACTIVE      =    "true"
            TIMEOUT     =    "600"
            NUM_PACKETS    =         "0"
            NUM_SAMPLES    =         "0"
            THRESHOLD_LIST    =         "EXISTS"
            CONFIGURED_MIN_THRESHOLD    =         "10.0"
            ATTACK_DETECTION_THRESHOLD    =         "288.0"
        >
            <THRESHOLD_LIST>
                <DUMMY_ENTRY ATTACK_DETECTION_THRESHOLD = "0.0">
                    <KEY DST_IP    =    "DUMMY"/>
                </DUMMY_ENTRY>
                <ENTRY       ATTACK_DETECTION_THRESHOLD    =    "512">
                    <KEY    DST_IPS    =    "1"    />
                </ENTRY>
```

APPENDIX A-continued

```
        <ENTRY    ATTACK_DETECTION_THRESHOLD  =   "107">
          <KEY    DST_IPS   =   "5"    />
        </ENTRY>
        <ENTRY    ATTACK_DETECTION_THRESHOLD  =   "52">
          <KEY    DST_IPS   =   "10"   />
        </ENTRY>
        <ENTRY    ATTACK_DETECTION_THRESHOLD  =   "4">
          <KEY    DST_IPS   =   "20"   />
        </ENTRY>
        <ENTRY    ATTACK_DETECTION_THRESHOLD  =   "2">
          <KEY    DST_IPS   =   "50"   />
        </ENTRY>
        <ENTRY    ATTACK_DETECTION_THRESHOLD  =   "1">
          <KEY    DST_IPS   =   "100"  />
        </ENTRY>
      </THRESHOLD_LIST>
</ATTACK_RECOGNIZER>
```

APPENDIX B

| ID | Action | Exp Time | Source IP | Source Mask | Proto | DPort | Frg | RxRate(pps) |
|----|--------|----------|-----------|-------------|-------|-------|-----|-------------|
| 1 | notify | forever | 1.1.1.1 | 255.255.255.255 | 6 | 139 | no | N/A |
| 2 | notify | forever | * | 255.255.255.255 | 6 | 445 | no | N/A |
| 3 | drop | forever | 2.2.2.2 | 255.255.255.255 | 6 | 445 | no | N/A |
| 4 | drop | forever | 2.2.2.3 | 255.255.255.255 | 6 | 445 | no | N/A |
| ... |  |  |  |  |  |  |  |  |

APPENDIX C

| ID | Action | Exp Time | Source IP | Source Mask | Proto | DPort | Frg | RxRate(pps) |
|----|--------|----------|-----------|-------------|-------|-------|-----|-------------|
| 1 | notify | forever | 1.1.1.1 | 255.255.255.255 | 6 | 139 | no | N/A |

Attack flow: 6   1.1.1.1   *   *   *   no fragments
Triggering rate: 1 (sip)/701 (dip)   Threshold: 0 (sip)/700 (dip)
Policy: worm_tcp/139/analysis/non_estb_conns/scanners_histogram

| 2 | notify | forever | * | 255.255.255.255 | 6 | 445 | no | N/A |

Attack flow: 6   *   *   *   *   no fragments
Triggering rate: 21 (sip) Threshold: 20 (sip)/10 (dip)
Policy: worm_tcp/445/analysis/non_estb_conns/scanners_histogram

| 3 | drop | forever | 2.2.2.2 | 255.255.255.255 | 6 | 445 | no | N/A |

Attack flow: 6   *   *   172.20.3.254   *   no fragments
Triggering rate: 15 (dip) Threshold: 0 (sip)/10 (dip)
Policy: worm_tcp/445/analysis/non_estb_conns/scanners_histogram

| 4 | drop | forever | 2.2.2.2 | 255.255.255.255 | 6 | 445 | no | N/A |

Attack flow: 6   *   *   172.20.3.254   *   no fragments
Triggering rate: 21 (dip) Threshold: 0 (sip)/10 (dip)
Policy: worm_tcp/445/analysis/non_estb_conns/scanners_histogram

The invention claimed is:

1. A computer-implemented method for screening communication traffic, comprising:

defining a list of one or more threshold pairs including respective first and second threshold values, each of which first threshold values is greater than one;

monitoring network traffic from a plurality of sources, so as to determine for each source a count of unique destination addresses to which the source transmitted data during a period of time; and defining a plurality of bins for the unique destination addresses, each bin having a cut-off value and holding a number of source IP addresses that attempted to establish connections with a number of unique destination IP addresses greater than the cut-off value for the bin; and responsively to finding that each of a first number of the sources sent data to at least a second number of the destination addresses:

reducing a threshold value by setting the threshold value to the cut-off value of a bin whose threshold was exceeded; and invoking a response to malicious network traffic, wherein, for at least one of the threshold pairs, the first number is at least equal to the respective first threshold value, and the second number is at least equal to the respective second threshold value.

2. The method according to claim 1, wherein the list includes two or more threshold pairs, and wherein defining the list comprises defining the list of the two or more threshold pairs.

3. The method according to claim 2, wherein the first threshold value of a first one of the pairs is greater than the first threshold value of a second one of the pairs, and the second threshold value of the first one of the pairs is less than the second threshold value of the second one of the pairs.

4. The method according to claim 2, wherein invoking the response comprises blocking at least a portion of the data sent from the plurality of sources.

5. The method according to claim 2, wherein defining the list comprises:
monitoring the network traffic from the plurality of sources during a period of time considered to be peacetime, so as to determine for each source a baseline count of the unique destination addresses to which the determining, responsively to monitoring the network during the peacetime period to at least a fourth number defining the first and second threshold values of source transmitted data during the peacetime period;
traffic, that each of a third number of sources sent data of destination addresses; and
one of the pairs based on the third and fourth numbers.

6. The method according to claim 2, wherein defining the list comprises performing an analysis of the network traffic during the period of time, and defining the list responsively to the analysis.

7. The method according to claim 2, and comprising:
defining a global threshold value; and
blocking data sent from one of the sources upon determining that the one of the sources sent data to a third number of the destination addresses at least equal to the global threshold value during the period of time, without regard to finding that each of the first number of the sources sent data to at least the second number of the destination addresses.

8. The method according to claim 7, wherein defining the global threshold value comprises decreasing the global threshold value upon finding that each of the first number of the sources sent data to at least the second number of the destination addresses.

9. The method according to claim 1, wherein invoking the response comprises determining that at least a portion of the network traffic was generated by a worm.

10. The method according to claim 1, wherein monitoring comprises monitoring the network traffic from the plurality of sources, so as to determine for each source the count of unique destination addresses with which the source attempted to establish connections during the period of time.

11. The method according to claim 10, wherein monitoring comprises monitoring the network traffic from the plurality of sources, so as to determine for each source the count of unique destination addresses with which the source unsuccessfully attempted to establish the connections during the period of time.

12. The method according to claim 1, wherein invoking the response comprises blocking at least a portion of the data sent from the plurality of sources.

13. The method according to claim 1, wherein defining the list comprises:
monitoring the network traffic from the plurality of sources during a period of time considered to be peacetime, so as to determine for each source a baseline count of the unique destination addresses to which the source transmitted data during the peacetime period;
determining, responsively to monitoring the network traffic, that each of a third number of the sources sent data during the peacetime period to at least a fourth number of the destination addresses; and
defining the first and second threshold values of one of the pairs based on the third and fourth numbers.

14. The method according to claim 1, wherein defining the list comprises performing an analysis of the network traffic during the period of time, and defining the list responsively to the analysis.

15. The method according to claim 1, and comprising:
defining a global threshold value; and
blocking data sent from one of the sources upon determining that the one of the sources sent data to a third number of the destination addresses at least equal to the global threshold value during the period of time, without regard to finding that each of the first number of the sources sent data to at least the second number of the destination addresses.

16. The method according to claim 15, wherein defining the global threshold value comprises decreasing the global threshold value upon finding that each of the first number of the sources sent data to at least the second number of the destination addresses.

17. The method according to claim 1,
wherein monitoring the network traffic comprises monitoring the network traffic from the plurality of sources using a destination protocol port, so as to determine for each source the count of unique destination addresses to which the source transmitted data using the destination protocol port during the period of time, and
wherein invoking the response comprises invoking the response responsively to finding that each of the first number of the sources sent data to at least the second number of the destination addresses using the destination protocol port.

18. The method according to claim 1, wherein at least one of the second threshold values is greater than one.

19. Apparatus for screening communication traffic, comprising:
an event detector using hardware elements, which is adapted to monitor network traffic from a plurality of sources, so as to determine for each source a count of unique destination addresses to which the source transmitted data during a period of time, and which contains a plurality of bins for the unique destination addresses, each bin having a cut-off value and holding a number of source IP addresses that attempted to establish connections with a number of unique destination IP addresses greater than the cut-off value for the bin; and
a recognition module using hardware elements, which is adapted:
to define a list of one or more threshold pairs including respective first and second threshold values, each of which first threshold values is greater than one;
to reduce a threshold value by setting the threshold value to the cut-off value of a bin whose threshold was exceeded; and
to invoke a response to malicious network traffic responsively to finding that each of a first number of the sources sent data to at least a second number of the destination addresses, wherein, for at least one of the threshold pairs, the first number is at least equal to the respective first threshold value, and the second number is at least equal to the respective second threshold value.

20. The apparatus according to claim 19, wherein the list includes two or more threshold pairs, and wherein the recognition module is adapted to define the list of the two or more threshold pairs.

21. The apparatus according to claim 20, wherein the first threshold value of a first one of the pairs is greater than the first threshold value of a second one of the pairs, and the second threshold value of the first one of the pairs is less than the second threshold value of the second one of the pairs.

22. The apparatus according to claim 20, wherein the recognition module is adapted to invoke the response by blocking at least a portion of the data sent from the plurality of sources.

23. The apparatus according to claim 20, wherein the recognition module is adapted:
   to determine for each source, responsively to the network traffic from the plurality of sources during a period of time considered to be peacetime, a baseline count of the unique destination addresses to which the during the peacetime period to at least a fourth number source transmitted data during the peacetime period, to determine, responsively to monitoring the network traffic, that each of a third number of sources sent data of destination addresses, and
   to define the first and second threshold values of one of the pairs based on the third and fourth numbers.

24. The apparatus according to claim 20, wherein the recognition module is adapted to perform an analysis of the network traffic during the period of time, and define the list responsively to the analysis.

25. The apparatus according to claim 20, wherein the recognition module is adapted to define a global threshold value, and block data sent from one of the sources upon determining that the one of the sources sent data to a third number of the destination addresses at least equal to the global threshold value during the period of time, without regard to finding that each of the first number of the sources sent data to at least the second number of the destination addresses.

26. The apparatus according to claim 25, wherein the recognition module is adapted to decrease the global threshold value upon finding that each of the first number of the sources sent data to at least the second number of the destination addresses.

27. The apparatus according to claim 19, wherein the recognition module is adapted to determine that at least a portion of the network traffic was generated by a worm.

28. The apparatus according to claim 19, wherein the event detector is adapted to monitor the network traffic from the plurality of sources, so as to determine for each source the count of unique destination addresses with which the source attempted to establish connections during the period of time.

29. The apparatus according to claim 28, wherein the event detector is adapted to monitor the network traffic from the plurality of sources, so as to determine for each source the count of unique destination addresses with which the source unsuccessfully attempted to establish the connections during the period of time.

30. The apparatus according to claim 19, wherein the recognition module is adapted to invoke the response by blocking at least a portion of the data sent from the plurality of sources.

31. The apparatus according to claim 19, wherein the recognition module is adapted:
   to determine for each source, responsively to the network traffic from the plurality of sources during a count of the unique destination addresses to which the period of time considered to be peacetime, a baseline source transmitted data during the peacetime period,
   to determine, responsively to monitoring the network traffic, that each of a third number of the sources sent data during the peacetime period to at least a fourth number of the destination addresses, and to define the first and second threshold values of one of the pairs based on the third and fourth numbers.

32. The apparatus according to claim 19, wherein the recognition module is adapted to perform an analysis of the network traffic during the period of time, and define the list responsively to the analysis.

33. The apparatus according to claim 19, wherein the recognition module is adapted to define a global threshold value, and block data sent from one of the sources upon determining that the one of the sources sent data to a third number of the destination addresses at least equal to the global threshold value during the period of time, without regard to finding that each of the first number of the sources sent data to at least the second number of the destination addresses.

34. The apparatus according to claim 33, wherein the recognition module is adapted to decrease the global threshold value upon finding that each of the first number of the sources sent data to at least the second number of the destination addresses.

35. The apparatus according to claim 19, wherein the event detector is adapted to monitor the network traffic from the plurality of sources using a destination protocol port, so as to determine for each source the count of unique destination addresses to which the source transmitted data using the destination protocol port during the period of time, and wherein the recognition module is adapted to invoke the response responsively to finding that each of the first number of the sources sent data to at least the second number of the destination addresses using the destination protocol port.

36. The apparatus according to claim 19, wherein at least one of the second threshold values is greater than one.

37. Apparatus for screening communication traffic, comprising:
   hardware means for defining a list of one or more threshold pairs including respective first and second threshold values, each of which first threshold values is greater than one;
   hardware means for monitoring network traffic from a plurality of sources, so as to determine for each source a count of unique destination addresses to which the source transmitted data during a period of time;
   hardware means for maintaining a plurality of bins for the unique destination addresses each bin having a cut-off value and holding a number of source IP addresses that attempted to establish connections with a number of unique destination IP addresses greater than the cut-off value for the bin;
   hardware means for invoking a response to malicious network traffic responsively to finding that each of a first number of the sources sent data to at least a second number of the destination addresses, and
   hardware means for reducing a threshold value by setting the threshold value to the cut-off value of a bin whose threshold was exceeded,
   wherein, for at least one of the threshold pairs, the first number is at least equal to the respective first threshold value, and the second number is at least equal to the respective second threshold value.

38. The apparatus according to claim 37, wherein the list includes two or more threshold pairs, and wherein the means for defining the list are adapted to define the list of the two or more threshold pairs.

39. A computer software product for screening packet-based communication traffic, the product comprising a computer-readable medium in which program instructions are stored, which instructions, when read by a computer, cause the computer:

to define a list of one or more threshold pairs including respective first and second threshold values, each of which first threshold values is greater than one, to monitor network traffic from a plurality of sources, so as to determine for each source a count of unique destination addresses to which the source transmitted data during a period of time, to define a plurality of bins for the unique destination addresses each bin having a cut-off value and holding a number of source IP addresses that attempted to establish connections with a number of unique destination IP addresses greater than the cut-off value for the bin; and responsively to finding that each of a first number of the sources sent data to at least a second number of the destination addresses:

to reduce a threshold value by setting the threshold value to the cut-off value of a bin whose threshold was exceeded; and to invoke a response to malicious network traffic, wherein, for at least one of the threshold pairs, the first number is at least equal to the respective first threshold value, and the second number is at least equal to the respective second threshold value.

40. The product according to claim 39, wherein the list includes two or more threshold pairs, and wherein the instructions cause the computer to define the list of the two or more threshold pairs.

* * * * *

UNITED STATES PATENT AND TRADEMARK OFFICE
CERTIFICATE OF CORRECTION

| | |
|---|---|
| PATENT NO. | : 7,624,447 B1 |
| APPLICATION NO. | : 11/222730 |
| DATED | : November 24, 2009 |
| INVENTOR(S) | : Horowitz et al. |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1112 days.

Signed and Sealed this

Twenty-sixth Day of October, 2010

David J. Kappos
*Director of the United States Patent and Trademark Office*